United States Patent
Bay

(10) Patent No.: US 6,988,560 B2
(45) Date of Patent: Jan. 24, 2006

(54) QUICK ATTACHMENT SYSTEM

(75) Inventor: Tod A. Bay, Sperry, IA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 10/696,451

(22) Filed: Oct. 29, 2003

(65) Prior Publication Data
US 2005/0095104 A1 May 5, 2005

(51) Int. Cl.
A01B 51/00 (2006.01)
A01B 59/00 (2006.01)

(52) U.S. Cl. .................. 172/272; 172/451; 172/677

(58) Field of Classification Search ............... 172/439, 172/451, 272, 274, 677
See application file for complete search history.

(56) References Cited

U.S. PATENT DOCUMENTS

| | | | | |
|---|---|---|---|---|
| 2,531,768 A | * | 11/1950 | Cline et al. .................. 172/248 |
| 3,338,594 A | * | 8/1967 | Schuler .................... 280/416.2 |
| 3,760,883 A | * | 9/1973 | Birk ............................ 172/273 |
| 3,876,092 A | | 4/1975 | MacDonald |
| 3,912,092 A | | 10/1975 | Bolton et al. |
| 4,037,681 A | * | 7/1977 | Gorby ......................... 180/235 |
| 4,236,329 A | * | 12/1980 | Hetrick .......................... 37/231 |
| 4,243,356 A | * | 1/1981 | Takojima ..................... 414/723 |
| 4,809,449 A | * | 3/1989 | Solaja .......................... 37/407 |
| 4,986,722 A | | 1/1991 | Kacmarcyk et al. |
| 5,082,065 A | * | 1/1992 | Fletcher ...................... 172/273 |
| 5,088,882 A | * | 2/1992 | Lovitt, Jr. .................... 414/723 |
| 5,097,609 A | * | 3/1992 | Swaggert ...................... 37/403 |
| 5,403,144 A | | 4/1995 | Staben, Jr. |
| 5,685,689 A | | 11/1997 | Schneider et al. |
| 5,692,573 A | * | 12/1997 | Zahn et al. ................. 172/439 |
| 5,779,429 A | | 7/1998 | Poole |
| 5,984,019 A | * | 11/1999 | Hund ......................... 172/439 |
| 6,422,805 B1 | | 7/2002 | Miller |
| 6,533,319 B1 | | 3/2003 | Denby et al. |
| 2003/0005605 A1 | | 1/2003 | Kaczmarski et al. |

* cited by examiner

Primary Examiner—Thomas B. Will
Assistant Examiner—Alexandra Pechhold
(74) Attorney, Agent, or Firm—John William Stader

(57) ABSTRACT

A system for quickly coupling a mounted implement and a towed implement to a tractor frame or chassis includes a hitching bracket with two hooks and two eyes that are fixed to the frame of the tractor and a plate that is fixed to the hooks and eyes to provide a mounting surface for the implement. The plate also includes a slot for inserting a drawbar that can be attached to a towed vehicle. The drawbar is positioned underneath the implement.

20 Claims, 3 Drawing Sheets

QUICK ATTACHMENT SYSTEM

FIELD OF THE INVENTION

The invention relates generally to work vehicles such as tractors. More particularly, it relates to vehicle mounts or hitches for hitching other devices to such work vehicles.

BACKGROUND OF THE INVENTION

Vehicles such as tractors often need to be attached to implements. The implements may be towed on their own wheels or may be mounted in a fixed manner to the rear of the chassis or frame of the tractor. The former include wagons, carts, material spreaders, mowers and the like. The latter include pavement breakers, backhoe attachments, grading blades, ground breakers and plows, among other devices.

These different implements are affixed to the vehicle in different ways depending upon the desired flexibility and rigidity of the coupling between them. For a relatively rigid connection, such as for implements like plows or cultivators that need to be raised and lowered with some regularity, the chassis of frame of the vehicle is coupled to a three-point hitch assembly, which often includes an adjuster such as an adjustable eye or a hydraulic actuator that permit the hitch to be raised and lowered with respect to the vehicle's chassis.

Other implements such as wagons and carts can be coupled to the tractor simply by providing a bracket (or "drawbar") with a hole through which a pin can be inserted. These couplings are used to connect the tongues of wagons or other vehicles that do not need the vertical or lateral support of the rigid frame or chassis of the tractor.

These two couplings—the drawbar and the three-point hitch, are the generic couplings provided on most modern tractors. This is not to say, however, that the rear structures of the chassis or frame to which these are mounted are the same. Each tractor may be manufactured differently, and may have different and unique structures at the rear of the chassis or frame. Nonetheless, the vast majority include brackets or linkages affixed to the chassis or frame that provide the three point arrangement or have a drawbar receiving aperture.

Many tractors, due to the specialized uses for which they are sold, do not come equipped with a three-point hitch assembly mounted onto the chassis or frame. These tractors are often too small in practice to pull the kind of implements (plow, cultivator, etc) that are fixed to three point hitches. Furthermore, they are often bought with other specialized applications in mind that do not couple to a three point hitch. Examples include ditch digging attachments, backhoe attachments, pavement breaking attachments, pavement cutting attachments, road grading attachments and the like.

One difficulty with such vehicles is the lack of a standard hitching structure that a variety of these specialized attachments or implements can be fixed to. The traditional three point hitch is large and often unwieldy on such small tractors, and a simple means of towing the implement, while necessary, is not enough to support the implement.

Several systems for attaching an implement to a vehicle are worth mentioning.

U.S. Pat. No. 5,779,429 illustrates a system for quickly attaching an implement to a tractor. This device includes an elongated rectangular channel to which four hooks extend upward. The device is fixed to the tractor and the implement rests on the four upwardly extending hooks.

U.S. Pat. No. 3,876,092 illustrates an implement connecting coupler mechanism that is structured generally as a four bar linkage having one bar coupled to the frame of the tractor and the opposing bar of the linkage configured to be rapidly connected to an implement. A hydraulic cylinder is coupled to and extends between the two links to permit the implement link to be raised and lowered with respect to the tractor.

U.S. Pat. No. 3,912,092 is directed to a tractor lift, including a tubular framework that is coupled to the free ends of a three-point hitch A scoop-shaped enclosure is pivotally fixed to the bottom of this framework. The scoop-shaped enclosure has a lip along its upper edge that is hooked over the top of the framework.

U.S. Pat. No. 4,986,722 is directed to a mounting structure for a loading attachment. The structure includes two opposing tubular extensions at the bottom front ends of a pair of tractor loader arms and a shallow upwardly facing trough at the top of the ends of the loader arms. An implement, here shown as bucket, has an elongated tubular section that is sized to fit in the trough. The implement is supported by the trough. When the arms are lifted, the bucket pivots inward toward the tractor along its bottom edge and has horizontal slots that engage the two opposing tubular extensions extending from the bottom of the free ends of the loader arms.

U.S. Pat. No. 5,088,882 is directed to a universal coupling for coupling a front end working member, such as a bucket or other implement, to the ends of the loader lift arms of a tractor. The implement includes two downwardly opening hooks extending directly from the surface of the bucket and two lower more widely spaced-apart eyes. The hooks engage a short tubular member fixed to and extending between two vertically extending spaced apart plates. The plates are spread apart at their bases and define two slots therebetween for receiving the eyes of the bucket. There are holes in the plates for receiving laterally extending elongate members such as pins, bolts or the like that extend through the plates and through the eyes to hold them together. In this manner, the bucket or other implement is fixed to the ends of the vehicle's loader arms.

U.S. Pat. No. 5,403,144 is directed to a blade tilt assembly for a front end loader. The assembly includes a generally flat plate that extends laterally and vertically with respect to a skid steer vehicle. The plate has a laterally and horizontally extending top edge and a bottom edge that supports pins that can be extended downwardly. This plate is fixed to the ends of the vehicle's loader lift arms to couple a bucket to the skid steer vehicle. A rectangular metal frame is fixed to the back of the bucket, sized to receive the plate fixed to the loader lift arms. The frame includes a downwardly facing slot that receives the top edge of the plate. It also includes two vertically oriented holes that receive the two pins extending from the bottom of the plate. In this manner the top and the bottom of the plate are fixed to the ends of the loader lift arms.

U.S. Pat. No. 5,685,689 is directed to a quick attach system for a front end loader. It includes a blade for a front end loader that has horizontally extending tubular structures along its upper edge. The blade also has two eyes extending outward from and away from the rear of the blade. The loader arms have a framework that receives the blade. This framework includes an elongate tubular member to which are coupled two vertically extending members on each end. These vertically extending members have laterally extending trough-like structures that cradle the tubular structures to support the tubular structures and the blade to which they are coupled. The bottom of the vertically extending members supports slideable pins that engage the eyes on the blade.

U.S. Pat. No. 5,779,329 is directed to a mechanism allowing quick implement attachment to tractors. It includes a framework of a laterally extending rectangular tubular member that is fixed to two vertically extending members at each end of the tubular member. These vertically extending members have hooks at their upper ends and lower ends that face upward to receive laterally extending tubular structures of an implement. The framework is fixed to the ends of jointed arms that extend outward from the rear of a tractor and hold the implement to the ends of the arm. Latches extending across the open tops of the upper hooks hold the implement in place.

U.S. Pat. No. 6,422,805 is directed to a quick coupler for bucket excavators. It is directed to a latch for latching to a tubular structure, for example, a tubular structure on an implement.

U.S. Pat. No. 6,533,319 is directed to a ballast attachment for attaching a ballast to a rear three-point hitch of a tractor. A rod extends longitudinally between the two lower arms of a three-point hitch. A downwardly-facing notch or groove in a ballast receives the rod and rests upon it. In this manner the three-point hitch supports the ballast.

U.S. Patent Application Publication Number US2003/0005605 A1 is directed to a mounting plate for quick attachment bracket and bucket construction.

None of the foregoing references provide an adequate system for coupling directly to the frame or chassis of a tractor or other work vehicle to support an implement. Most disclose structures that are not attached directly to the frame or chassis of the vehicle to provide a mounting point for implements, but are attached to the implements themselves, such as couplings for attaching buckets to the end of implements such as loader arms already attached to the vehicle—they do not disclose a way of attaching the implement itself to the frame or chassis.

What is needed therefore is a hitching structure fixed to the rear of a tractor's frame or chassis for coupling an implement directly to the frame or chassis of the vehicle.

What is also needed is a structure that can be attached quickly and with a minimum of effort to the rear frame of a tractor and to a variety of implements.

What is also needed is a structure having surfaces that are readily couplable to a variety of implements.

It is an object of this invention to satisfy the foregoing needs by providing a system that, in one or more of its claimed embodiments, solves the problems described above. It should be recognized, however, that not every arrangement claimed below addresses all of the needs and provides all of the benefits identified above.

SUMMARY OF THE INVENTION

In accordance with a first aspect of the invention, a quick attachment system for a work vehicle having a frame defining an upper pair and a lower pair of holes formed in opposing pairs of vertically and longitudinally extending frame plates, the upper pair of holes having a first common horizontal and laterally extending axis and the lower pair of holes having a second common horizontal and laterally extending axis, the system including a first elongate member extending between a nd coupling the upper pair of holes; a first hook that opens downward to engage the first elongate member adjacent a first of the upper pair of holes; a second hook that opens downward to engage the first elongate member adjacent a second of the upper pair of holes; a first eye having a first hole configured to be disposed adjacent to a first of the lower pair of holes; a second eye having a second hole configured to be disposed adjacent to a second of the lower pair of holes; and a plate that is coupled to and between the first and second eyes and the first and second holes.

The plate may be configured to extend generally perpendicularly to the longitudinal axis of the vehicle. The first hook and the first eye may be disposed on a first elongate member fixed to the plate, and the second hook and the second eye may be disposed on a second elongate member fixed to the plate. The first and second elongate members may extend vertically along the plate. The system may further include a drawbar, and the plate may include an aperture disposed along the lower edge of the plate that is configured to receive the drawbar and support the drawbar in a generally horizontal and longitudinally extending position. The plate may include a plurality of holes configured to receive threaded fasteners to fix an implement directly to the plate. The draw bar may be disposed to extend underneath the implement.

In accordance with a second aspect of the invention, a quick attachment system for coupling a drawbar and an implement directly to a frame of a work vehicle, where the frame includes two laterally opposed frame plates that extend longitudinally and are perpendicular to the ground, each of the frame plates having an upper hole and a lower hole disposed one above the other at the rear edge of the frame plate, and where the upper holes of the frame plates share a first laterally extending horizontal axis and where the lower holes share a second laterally extending horizontal axis, the system including at least a first laterally extending member coupled to the upper holes of the frame plates; at least a second laterally extending member coupled to the lower holes of the frame plates; a first hook that opens downward to engage the at least a first member adjacent a first of the upper pair of holes; a second hook that opens downward to engage the at least a first member adjacent a second of the upper pair of holes; a first eye having a first hole engaging the at least a second member; a second eye having a second hole engaging the at least a second member; and an implement mounting plate coupled to and between the first and second eyes and the first and second holes, the plate having mounting holes for attaching an implement thereto and an aperture for receiving a drawbar.

The mounting plate may extend perpendicular to the longitudinal axis of the vehicle. The first hook and the first eye are disposed on a first elongate member fixed to the plate, and further the second hook and the second eye are disposed on a second elongate member fixed to the mounting plate. The at least a first member may be a single cylindrical pin extending between and coupling the upper holes, and the at least a second member may include a first lower pin coupling the first eye to one of the lower holes of the frame plates and a second lower pin coupling the second eye to another of the lower holes of the frame plates. The system may also include a drawbar, and the mounting plate may include an aperture that is configured to receive the drawbar and support the drawbar in a generally horizontal and longitudinally extending position. The mounting plate may define a plurality of holes extending therethrough and the mounting plate may be configured to receive threaded fasteners to fix an implement directly to the mounting plate. The draw bar may be disposed to extend underneath the implement.

In accordance with a third aspect of the invention, a quick attachment system is provided for a work vehicle having a frame defining an upper and a lower pair of coupling holes formed in opposing pairs of vertically and longitudinally extending frame plates, the upper pair of holes having a first common horizontal and laterally extending axis and the lower pair of holes having a second common horizontal and laterally extending axis, the system including a means for coupling the upper pair of holes; a first means for engaging the first elongate member adjacent a first of the upper pair of holes; a second means for engaging the first elongate member adjacent a second of the upper pair of holes; a third means disposed adjacent to a first of the lower pair of holes for coupling to the first hole of the lower pair of holes; a fourth means disposed adjacent to a second of the lower pair of holes for coupling the second of the lower pair of holes; and a means for coupling the first second, third and forth means together and for attaching to and supporting an implement.

The first means and second means may include two parallel spaced-apart downwardly opening hooks. The third and fourth means include two parallel space-apart eyes. The first of each of the two hooks and two eyes may be disposed together on a first elongate member fixed to the means for coupling, and further, a second of each of the two hooks and two eyes may be disposed together on a second elongate member fixed to the means for coupling. The system may include a drawbar, and the means for coupling may include at least one mounting plate, and the at least one mounting plate may include an aperture disposed along the lower edge of the at least one mounting plate that is configured to receive and support the drawbar. The system may include an implement drawbar, and further the at least one mounting plate may include an aperture disposed along the lower edge of the at least one mounting plate that is configured to receive the drawbar and support the drawbar in a generally horizontal and longitudinally extending position.

BRIEF DESCRIPTION OF THE FIGURES

Preferred exemplary embodiments of the present invention are illustrated in the accompanying drawings in which like reference numerals represent like parts throughout.

DETAILED DESCRIPTION OF THE PREFERRED EMBODIMENTS

Figure 1:
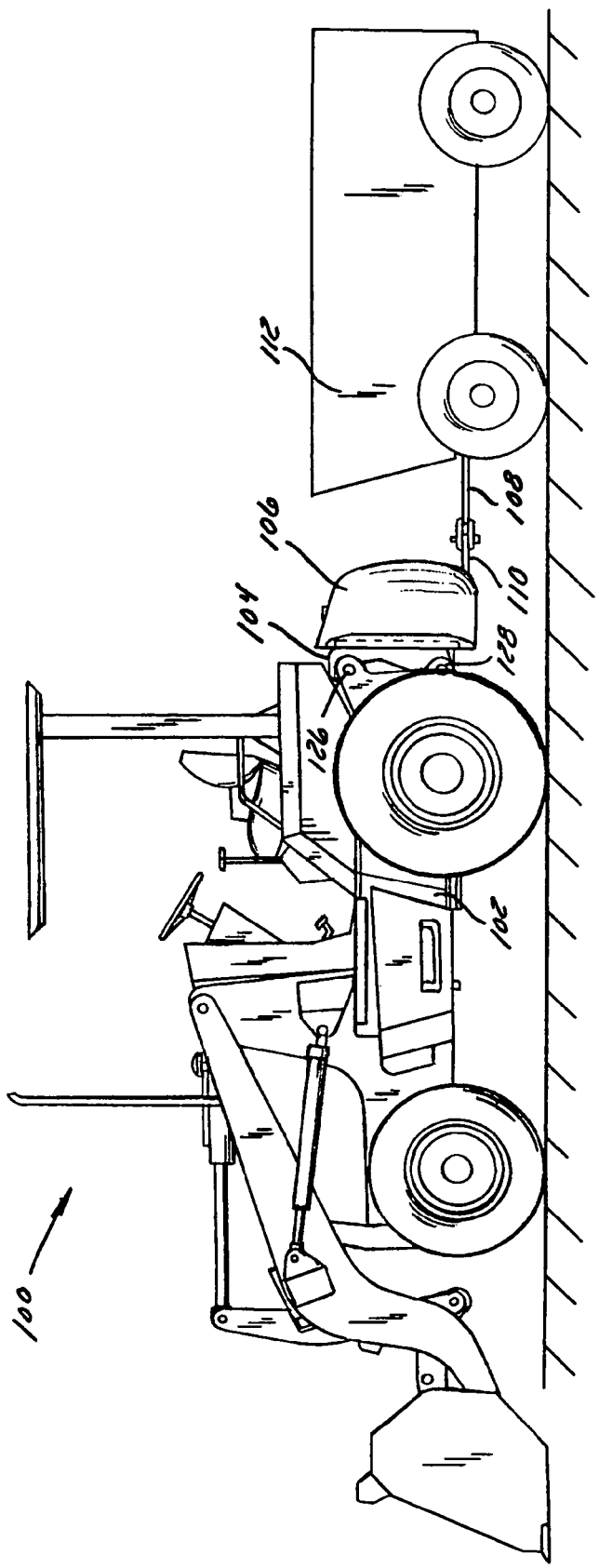
FIG. 1 is a side view of a vehicle train, including a work vehicle having a hitching structure fixed to the rear of its frame, an implement mounted on the hitching structure, and a wheeled vehicle pivotally coupled to the hitching structure by a drawbar.
Figure 2:
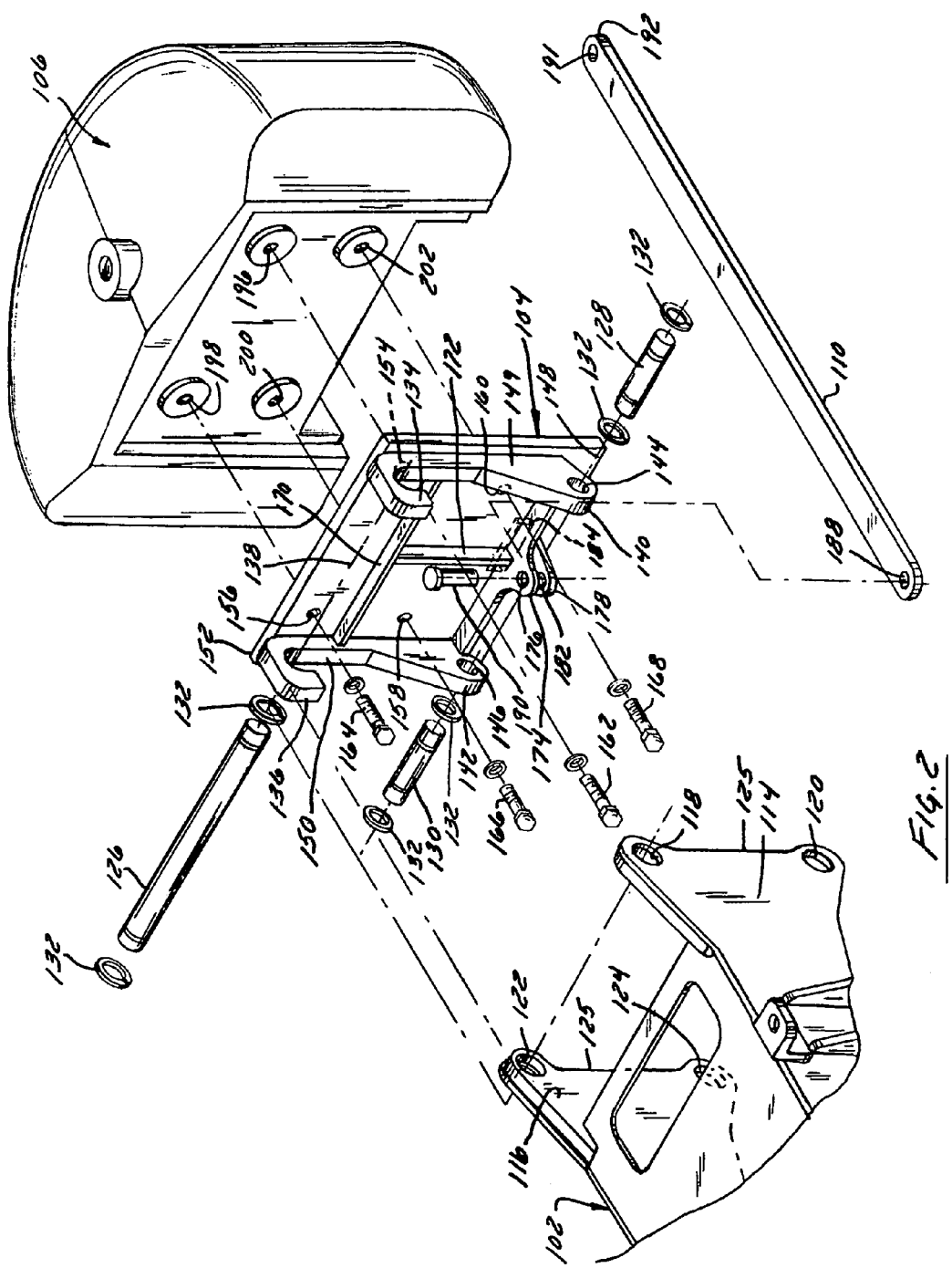
FIG. 2 is a perspective exploded view of the rear of the tractor of FIG. 1, showing the two plates that form the rear of the frame, the hitching structure, the pins that couple the hitching structure to the chassis, the ballast that is coupled to the hitching structure, and the drawbar that is coupled to the hitching structure.
Figure 4:
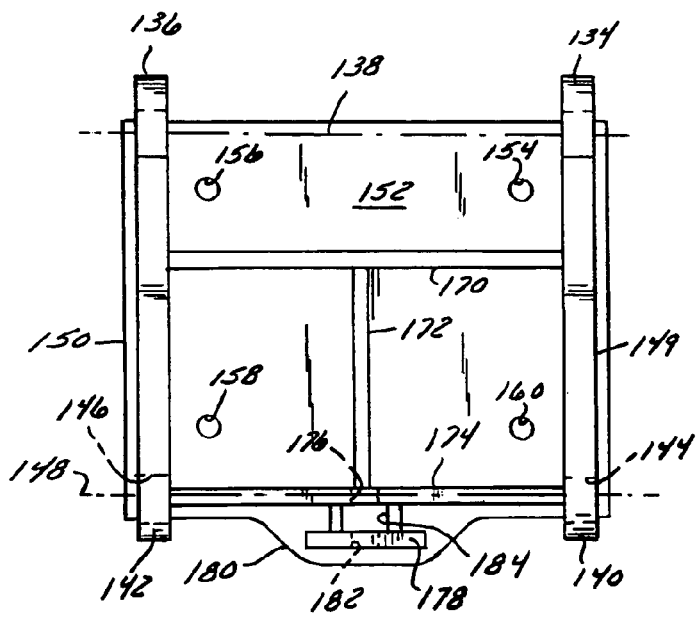
FIGS. 3, 4, and 5 are bottom, front and left side views of the hitching structure as it would be fixed to the frame of the tractor of FIGS. 1–2.
Figure 5:
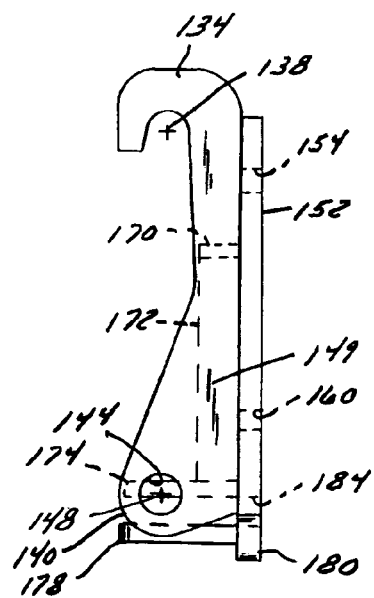
Figure 3:
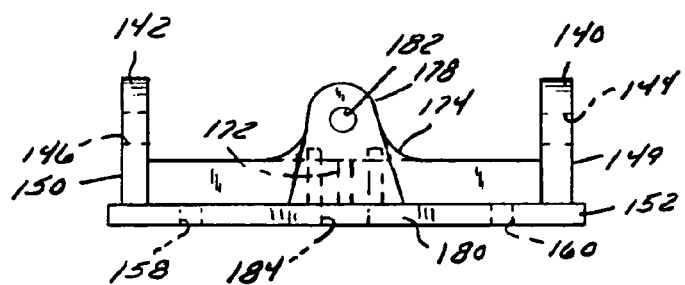

Referring to FIGS. 1–5, a work vehicle, shown as tractor 100 in FIGS. 1 and 2, has a frame 102 to which a hitching structure 104 is mounted. An implement 106 (here shown as a ballast or counterweight) is fixed to the hitching structure. A drawbar 110 is also fixed to hitching structure 104 and extends rearward underneath implement 106 whereat it is coupled to the tongue 108 of a towed implement 112 (here shown as a four-wheel trailer).

Tractor 100 is a New Holland Model LV-70 tractor. It has a frame 102 that includes two elongated rearwardly extending members. These members extend both vertically and generally fore-and-aft to define two spaced-apart plates 114, and 116 at the rear of the tractor.

Frame plates 114 and 116 each include two holes for mounting attachments to the vehicle. Plate 114 has an upper hole 118 and a lower hole 120. Hole 118 is disposed vertically above hole 120. Each of these two holes extends laterally through plate 114, and each hole 118, 120 defines a generally laterally extending and horizontal axis. Plate 116 has an upper hole 122 and a lower hole 124. Hole 122 is disposed vertically above hole 124. Each of these two holes 122, 124 extends laterally through plate 116, and each hole 122, 124 defines a generally laterally extending and horizontal axis. Holes 118 and 122 are coaxial. Holes 120 and 124 are also coaxial. Each of holes 118, 120, 122, and 124 extends through semicircular protrusions from the generally vertical rear edge 125 of their respective frame plates.

The hitching structure 104 is coupled directly to frame 102 of vehicle 100 by an upper pin 126, a left side lower pin 128, and a right side lower pin 130. Each of these three pins is fixed in place by snap rings 132 that are installed in grooves at both ends of each pin. These snap rings prevent the pin from being withdrawn once it is in place.

The upper pin is a laterally extending member coaxial with the two upper holes. While a single pin is preferred, separate pins or laterally extending members may be fixed to or engaged with the upper holes to support the hooks of the hitching structure 104.

The lower pins are laterally extending members coaxial with the lower holes. While two pins are preferred, a single pin or laterally extending member may be employed to couple the eyes of the hitching structure to their respective lower holes.

The hitching structure includes two hooks, a left-hand hook 134 and a right-hand hook 136, disposed on the left and the right side of the hitching structure 104, respectively. Hooks 134 and 136 open downwardly to receive and be supported by a cylindrical structure (in this case upper pin 126) when the hitching structure is lowered down upon pin 126. The internal radius of the hooks is nominally +25 mm, slightly larger than the 50 mm outer diameter of pin 126.

The hooks are coaxial and parallel to each other. The inner radial surfaces of both hooks are defined by a laterally extending horizontal axis 138.

When mounted on the tractor 100, hooks 134, 136 face forward to engage the pin along the length of the pin that extends between frame plates 114 and 116. Hooks 134, 136 are 30 mm thick as measured in the lateral direction.

Below each of the two hooks 134, 136, are two corresponding eyes 140, 142 that are parallel to each other and in a spaced-apart relation. Eye 140 is disposed directly below hook 134 and eye 142 disposed directly below hook 136. Holes 144, 146, that define respective eyes 140, 142, are coaxial, sharing a common laterally extending longitudinal and horizontal axis 148. Axis 148, which passes through and defines holes 144 and 146, is directly below and parallel to axis 138 that defines the curved inner surface of hooks 134 and 136.

Eyes 140 and 142 are secured to holes 120 and 124 by pins 128 and 130, respectively. Pin 128 passes through and couples holes 144 and 120. Pin 130 passes through and couples holes 146 and 124.

Hooks 134 and 136 are spaced apart such that they both just fit between plates 114 and 116 with hook 134 adjacent to and abutting frame plate 114, and hook 136 adjacent to and abutting frame plate 116. Eyes 140 and 142 are similarly spaced apart such that they both just fit between plates 114 and 116 with eye 140 adjacent to and abutting frame plate 114 and eye 142 adjacent to and abutting frame plate 116. The clearance between the hooks and eyes, and the plates is on the order of 0.5 to 2.0 millimeters. This close spacing prevents the hooks and eyes from sliding laterally and rubbing against the pins that support them.

In the preferred embodiment, left side hook 134 and eye 140 are formed from a single elongate member, here shown as a vertically extending elongate bar of steel 149. Similarly, right side hook 136 and eye 142 are preferably formed from a single elongate member, shown here as a vertically extending elongate bar of steel 150.

In addition to elongate members 149 and 150, hitching structure 104 includes a vertically and laterally extending plate 152 to which member 149 and 150 are fixed (by welding in this case). Plate 152 has four through-holes 154, 156, 158, 160, that are arranged in a rectangular pattern. The holes are laterally spaced apart about 320 mm and are vertically spaced apart 280 mm.

Threaded fasteners 162, 164, 166, and 168 are inserted through these through-holes to fasten plate 152 (and hence hitching structure 104) to implement 106. In the embodiment of FIGS. 1 and 2, implement 106 is a ballast used to anchor the rear wheels more firmly on the ground.

Plate 152 has a lateral width of 580 mm, a thickness of 20 mm and a height of 465 mm. This provides a suitable area for coupling an implement to, whether that implement is a ballast, such as illustrated here, a backhoe attachment, a pavement breaker, saw or other device.

Hitching structure 104 also includes a horizontal rib 170 that extends horizontally across the forward face of plate 152. This rib is disposed generally perpendicularly to the surface of the plate extending outward and forward from plate 152. It is fixed (preferably by welding) on each end to vertical hook and eye members 149 and 150.

Hitching structure 104 further includes a vertical rib 172 that is also fixed (preferably by welding) to the forward surface of plate 152. Rib 172 is disposed along the lateral centerline of plate 152 and is fixed (preferably by welding) at its upper end to rib 170.

Hitching structure 104 also includes an upper drawbar coupling 174 that is fixed (preferably welded) to plate 152 just above the bottom edge of plate 152. Drawbar coupling 174 is preferable formed as a single horizontally extending elongate member that is fixed (preferably by welding) to plate 152 and to vertical members 149 and 150 at each of the ends of coupling 174.

Coupling 174 has a vertically extending hole 176 that passes through coupling 174 forward of plate 152. Hole 176 is sized to receive a standard drawbar coupling pin 190 passing therethrough.

Hitching structure 104 includes a second drawbar coupling 178 that is also fixed (preferably welded) to a downwardly extending protrusion 180 of plate 152 just above the bottom edge of plate 152. Drawbar coupling 178 is preferable formed as a single horizontally extending member. Coupling 178 like coupling 174 has a vertically extending hole 182 that is coaxial with and directly underneath hole 176 such that drawbar coupling pin 190 passing through hole 176 will continue on into hole 182.

The bottom of plate 152 includes an aperture 184, here shown as a slot, which is formed therein. This aperture is configured to receive drawbar 110 to which vehicle 112 or other implement may be coupled.

To couple an implement to the tractor, drawbar 110 is first coupled to hitching structure 104. Drawbar 110 is an elongate member having an aperture 188 that is sized to receive a pin passing through holes 176 and 182 of the drawbar couplings. The forward end of drawbar 110 is passed through aperture 184 of plate 152 until aperture 188 is axially aligned with holes 176 and 182. Once in this position, a pin 190 is passed through and retained in holes 176, 182 and aperture 188. Pin 190 prevents drawbar 110 from being withdrawn from hitching structure 104. The opposite end of drawbar 110 includes a second aperture 191 to which a towed implement 112 is coupled.

Drawbar 110 extends completely underneath the implement fixed to plate 152 (e.g. the ballast) and out from under the rear of the implement. In this manner, the rear end 192 of drawbar 110 can be easily coupled to various towed implements and also can be easily removed prior to the removal of hitching structure 104 from frame 102 of tractor 100.

The combined vehicle in FIG. 1 may be assembled as follows. First, the operator inserts upper pin 126 through holes 118 and 122 in plates 114 and 116. The operator also fixes retaining rings 132 to both of the free ends of pin 126 to prevent pin 126 from slipping out of holes 118 and 122.

The operator also attaches hitching structure 104 to implement 106 by passing threaded fasteners 162, 164, 166, and 168 through holes 154, 156, 158, 160, respectively, and threading them into corresponding threaded holes 196, 198, 200, 202 in implement 106.

The operator then lifts combined implement 106 and hitching structure 104 and maneuvers the combined structure into position until the open ends of hooks 134 and 136 are disposed above pin 126. The operator then lowers the combined implement and hitching structure until the root of hooks 134, 136, rests on pin 126 supporting the weight of implement 106.

Once a portion of the weight of the combined structure 104 and 106 is resting on pin 126, lower holes 120, 124 of plates 114, 116 can be readily aligned with holes 144, 146 of eyes 140, 142, respectively. This is true since the vertical spacing between holes 118, 122 and holes 120, 124 is the same as the spacing between the cylindrical root of hooks 134, 136 and holes 144, 146, respectively. Resting hooks 134, 136 on pin 126 automatically aligns the lower holes with a modicum of implement pivoting.

With the implement pivoted into the proper position to align the lower holes, the operator inserts pin 128 through holes 120 and 144, and inserts pin 130 through holes 124 and 146. The operator then attaches retaining rings 132 to the free ends of pins 128 and 130 to hold them in the holes.

At this point, the implement is fixed to the rear frame of the tractor with one intermediate structure: hitching structure 104. It cannot move relative to the tractor frame. It cannot be raised or powered by hydraulic cylinders or other adjusting devices.

With the implement in place, the operator can then release the implement (which has most probably been lifted in place by other mechanical means, such as a chain fall, crane, forklift, telehandler, or improvised lifting device such as the bucket of another tractor), and let the tractor support the entire weight of the implement.

With the hitching device and implement securely fixed to the back of the tractor, there is room for the operator to reach under implement 106 and insert drawbar 110 through aperture 184 of plate 152. The operator slides the drawbar 110 forward until holes 176 and 182 are aligned with aperture 188 of drawbar 110.

The operator then inserts pin 190 through holes 176, 182 and aperture 188 and secures the pin in place.

With the drawbar in position, the operator then attaches tongue 108 of towed implement 112 to the free rear end 192 of drawbar 110. The entire vehicle shown in FIG. 1 is now assembled and ready for transport.

While the embodiments illustrated in the FIGURES and described above are presently preferred, it should be understood that these embodiments are offered by way of example only. The invention is not intended to be limited to any particular embodiment, but is intended to extend to various modifications that nevertheless fall within the scope of the appended claims.

For example, while two upper hooks and two lower eyes are illustrated, two upper eyes and two lower hooks may be employed instead, or four upper and lower eyes, or four upper and lower hooks employed.

While the hooks and eyes are illustrated as parts of two vertically extending members, each hook and eye may be separately attached to the mounting plate of the hitching structure.

While there are four mounting holes illustrated in the figures, a mounting plate with no holes may be provided, for example, to attach the mounting plate to an implement by welding, or by using threaded fasteners that extend through the implement and thence into the mounting plate. Alternatively, several holes may be provided in the mounting plate, but they may be disposed in a different pattern unlike the rectangular pattern illustrated here.

The mounting plate, while shown here as flat, may be somewhat curved, for example to accommodate a curved cast portion of an implement. It may also be less than perfectly flat by defining mounting pads, lands, ribs or other structures rising above the surface of the mounting plate for engaging with similar pads, lands or ribs on an implement.

A variety of generally cylindrical structures may be employed in place of the pins shown herein, such as bolts, screws, or other threaded fasteners; spring pins; generally cylindrical nipples, cones or other protrusions that may be inserted into the upper or lower holes and mate with them.

I claim:

1. A quick attachment system for a work vehicle having a frame defining an upper pair and a lower pair of holes formed in opposing pairs of vertically and longitudinally extending frame plates, the upper pair of holes having a first common horizontal and laterally extending axis and the lower pair of holes having a second common horizontal and laterally extending axis, the work vehicle having rear wheels, the frame extending from the rear of the vehicle forward to a point at least ahead of the rear wheels, the system comprising:
   a first elongate member extending between and coupling the upper pair of holes;
   a first hook that opens downward to engage the first elongate member adjacent a first of the upper pair of holes;
   a second hook that opens downward to engage the first elongate member adjacent a second of the upper pair of holes;
   a first eye having a first hole configured to be disposed adjacent to a first of the lower pair of holes;
   a second eye having a second hole configured to be disposed adjacent to a second of said lower pair of holes; and
   a plate that is coupled to and between the first and second eyes and the first and second holes.

2. The system of claim 1, wherein the plate is configured to extend generally perpendicularly to the longitudinal axis of the vehicle.

3. The system of claim 2, wherein the first hook and the first eye are disposed on a first elongate member fixed to the plate, and further wherein the second hook and the second eye are disposed on a second elongate member fixed to the plate.

4. The system of claim 3, wherein the first and second elongate members extend vertically along the plate.

5. The system of claim 4, further comprising a drawbar, and further wherein the plate includes an aperture disposed along the lower edge of the plate that is configured to receive said drawbar and support said drawbar in a generally horizontal and longitudinally extending position.

6. The system of claim 5, wherein the plate includes a plurality of holes configured to receive threaded fasteners to fix an implement directly to the plate.

7. The system of claim 6, wherein the draw bar is disposed to extend underneath the implement.

8. A quick attachment system for coupling a drawbar and an implement directly to a frame of a work vehicle, wherein the frame includes two laterally opposed frame plates that extend longitudinally and are perpendicular to the ground, each of the frame plates having an upper hole and a lower hole disposed one above the other at the rear edge of the frame plate, and wherein the upper holes of the frame plates share a first laterally extending horizontal axis and wherein the lower holes share a second laterally extending horizontal axis, the work vehicle having rear wheels, the frame extending from the rear of the vehicle forward to a point at least ahead of the rear wheels, the system comprising:
   at least a first laterally extending member coupled to the upper holes of the frame plates;
   at least a second laterally extending member coupled to the lower holes of the frame plates;
   a first hook that opens downward to engage the at least a first member adjacent a first of the upper pair of holes;
   a second hook that opens downward to engage the at least a first member adjacent a second of the upper pair of holes;
   a first eye having a first hole engaging the at least a second member;
   a second eye having a second hole engaging the at least a second member; and
   an implement mounting plate coupled to and between the first and second eyes and the first and second holes, the plate having mounting holes for attaching an implement thereto and an aperture for receiving a drawbar.

9. The system of claim 8, wherein the mounting plate extends perpendicular to the longitudinal axis of the vehicle.

10. The system of claim 9, wherein the first hook and the first eye are disposed on a first elongate member fixed to the plate, and further wherein the second hook and the second eye are disposed on a second elongate member fixed to the mounting plate.

11. The system of claim 10, wherein the at least a first member is a single cylindrical pin extending between and coupling the upper holes, and further wherein the at least a second member includes a first lower pin coupling the first eye to one of the lower holes of the frame plates and a second lower pin coupling the second eye to another of the lower holes of the frame plates.

12. The system of claim 11, further comprising a drawbar, and further wherein the mounting plate includes an aperture disposed along the lower edge of the mounting plate that is configured to receive said drawbar and support said drawbar in a generally horizontal and longitudinally extending position.

13. The system of claim 12, wherein the mounting plate defines a plurality of holes extending therethrough and wherein the mounting plate is configured to receive threaded fasteners to fix an implement directly to the mounting plate.

14. The system of claim 13, wherein the draw bar is disposed to extend underneath the implement.

15. A quick attachment system for a work vehicle having a frame defining an upper and a lower pair of coupling holes formed in opposing pairs of vertically and longitudinally extending frame plates, the upper pair of holes having a first common horizontal and laterally extending axis and the lower pair of holes having a second common horizontal and laterally extending axis, the work vehicle having rear wheels, the frame extending from the rear of the vehicle forward to a point at least ahead of the rear wheels, the system comprising:
a means for coupling the upper pair of holes;
a first means for engaging the first elongate member adjacent a first of the upper pair of holes;
a second means for engaging the first elongate member adjacent a second of the upper pair of holes;
a third means disposed adjacent to a first of said lower pair of holes for coupling to said first hole of said lower pair of holes;
a fourth means disposed adjacent to a second of said lower pair of holes for coupling said second of said lower pair of holes; and
a means for coupling the first second, third and forth means together and for attaching to and supporting an implement.

16. The system of claim 15, wherein said first means and second means include two parallel spaced-apart downwardly opening hooks.

17. The system of claim 16, wherein said third and fourth means include two parallel space-apart eyes.

18. The system of claim 17, wherein a first of each of the two hooks and two eyes are disposed together on a first elongate member fixed to the means for coupling, and further wherein a second of each of the two hooks and two eyes are disposed together on a second elongate member fixed to the means for coupling.

19. The system of claim 18, further comprising a drawbar, and further wherein the means for coupling includes at least one mounting plate, and further wherein the at least one mounting plate includes an aperture disposed along the lower edge of the at least one mounting plate that is configured to receive and support said drawbar.

20. The system of claim 19 further comprising an implement drawbar, and further wherein the at least one mounting plate includes an aperture disposed along the lower edge of the at least one mounting plate that is configured to receive said drawbar and support said drawbar in a generally horizontal and longitudinally extending position.

* * * * *